United States Patent
Kim

(10) Patent No.: US 6,288,787 B1
(45) Date of Patent: Sep. 11, 2001

(54) METHOD FOR PROCESSING GRAPHIC DATA IN A LASER PRINTER

(75) Inventor: Kwang-seuk Kim, Suwon (KR)

(73) Assignee: SamSung Electronics Co., Ltd., Suwon (KR)

(*) Notice: Subject to any disclaimer, the term of this patent is extended or adjusted under 35 U.S.C. 154(b) by 0 days.

(21) Appl. No.: 09/186,629

(22) Filed: Nov. 6, 1998

(30) Foreign Application Priority Data

Nov. 6, 1997 (KR) .................................................. 97-58321

(51) Int. Cl.[7] .................................................. G06K 15/00
(52) U.S. Cl. .................................................. 358/1.1; 358/1.12
(58) Field of Search .................................................. 358/612, 1.16, 358/1.1

(56) References Cited

U.S. PATENT DOCUMENTS

| | | | |
|---|---|---|---|
| 4,539,653 | * 9/1985 | Bartlett | 364/900 |
| 4,918,624 | 4/1990 | Moore et al. | 364/519 |
| 4,991,108 | 2/1991 | Hamilton | 364/514 |
| 4,992,956 | 2/1991 | Kaku et al. | 364/519 |
| 5,444,830 | 8/1995 | Oh et al. | 395/109 |
| 5,481,656 | 1/1996 | Wakabayashi et al. | 395/115 |
| 5,586,229 | 12/1996 | Kim et al. | 395/116 |
| 5,615,314 | 3/1997 | Schoenzeit et al. | 395/114 |
| 5,729,668 | 3/1998 | Claflin et al. | 395/114 |
| 5,737,602 | 4/1998 | Lee | 395/105 |

* cited by examiner

Primary Examiner—Jerome Grant, II
(74) Attorney, Agent, or Firm—Robert E. Bushnell, Esq.

(57) ABSTRACT

Disclosed is a method for processing graphic data in a laser printer capable of improving an effect of processing the graphic data, in which the graphic data are processed even though post-processing of the graphic data is not completed while pre-processing of the graphic data is performed. The method according to the present invention includes the steps of: processing low level graphic data which are inputted from a host computer to a laser printer to generate graphic elements; and generating and printing real bitmap image corresponding to a respective band on a recording paper during the feed of the recording paper after carrying out the pre-processing.

20 Claims, 3 Drawing Sheets

METHOD FOR PROCESSING GRAPHIC DATA IN A LASER PRINTER

CLAIM OF PRIORITY

This application makes reference to, incorporates the same herein, and claims all benefits accruing under 35 U.S.C. §119 from an application entitled METHOD FOR PROCESSING OF GRAPHIC DATA IN LASER BEAM PRINTER earlier filed in the Korean Industrial Property Office on the 6th day of November 1997, and there duly assigned Serial No. 97-58321, a copy of which is annexed hereto.

BACKGROUND OF THE INVENTION

1. Technical Field

The present invention relates to a method for processing graphic data, and more particularly to a method for processing graphic data in a laser printer capable of improving an effect of processing the graphic data.

2. Related Art

A printer is an image formation device which receives data from a host computer and then forms a corresponding image onto a recordable medium such as a sheet of paper.

In a laser printer, print data such as document data or image data are received from external equipment such as a host computer or a personal computer to develop the print data into printable bit image data. The developed bit image data are stored into a print image buffer. Then, a laser beam corresponding to bit image data of one raster read out from the print image buffer is emitted from a laser diode to perform a main scanning operation, thereby forming an electrostatic latent image on a photosensitive drum for every dot line. Thereafter, toner is attached to the electrostatic latent image on the photosensitive drum and then transferred onto a recordable medium such as a sheet of paper. The toner on the recordable medium is heated by a fixing heater of a fixing device to fix the toner on the recordable medium, thereby completing a print process. Laser printers are also referred to as electrophotographic printers.

In order to reduce the memory capacity of memory hardware required, some laser printers today are using a banded, or partial page, print image buffer approach in which image data of one page are divided in smaller plural bands that are imaged as the page is being printed, and two bit map memories, referred to as band buffers, which are alternately used to write and read the image data portions. In other words, a page of graphic data is divided into a plurality of bands of data. The printer will print data corresponding to the graphic data onto a recordable medium band by band.

Multimedia systems that are driven to present combinations of moving and still pictures, sound, music, and words, are pervasive in the industrialized world, especially in computers or in other entertainment appliances. Concurrent with the development of multimedia computer systems, peripheral equipment including image formation equipment such as printers, have been incrementally modified to provide various functions. A multi-tasking system, employing an ink-jet mechanism and serving as a facsimile and scanner, can be coupled to an external personal computer that performs a user-selected program and generates print data. The multi-tasking system can either receive data from the personal computer or scan data printed on the exposed surface of one or more documents. Multi-tasking systems include a scanner such as a laser flatbed or sheetfed scanner, for reading information existing on a document by scanning the document. With a sheetfed laser scanner, the scanner remains in a fixed state while the document bearing the information is moved in a vertical direction during laser scanning of its exposed surface. With a flatbed laser scanner, a laser beam is swept across a flat plate by the scanner modulated by video signals from a similar reading system or by digital signals generated by a computer.

Computer systems are information handling systems that are utilized by many individuals and businesses today. A computer system can be defined as a microcomputer that includes a central processing unit (CPU), a volatile memory, a non-volatile memory such as read only memory (ROM), a display monitor, a keyboard, a mouse or other input device such as a trackball, a floppy diskette drive, a compact disc-read only memory (CD-ROM) drive, a modem, a hard disk storage device, and a printer. A computer system's main board, which is a printed circuit board known as a motherboard, is used to electrically connect these components together.

Recently, office automation instruments such as a printer, a scanner, and a facsimile device are widely utilized. Respective office automation devices having a high performance are developed to expand a inherent function thereof. It is intended to produce more expensive instrument.

On the other hand, office automation instruments which are used to separately are developed to be integrated with each other in one piece, resulting in decreasing the economical burden of user. It is referred to as a combined office automation instrument or a multi-functional office device.

I have found that laser printers can be slow during print operations. Efforts have been made to improve laser printers.

Exemplars of recent efforts in the art include U.S. Pat. No. 5,729,668 for OPTIMIZED HARDWARE COMPRESSION AND DECOMPRESSION ARCHITECTURE FOR USE BY AN IMAGE PROCESSOR IN A LASER PRINTER issued to Claflin et al., U.S. Pat. No. 5,615,314 for INTERFACE FOR PROVIDING RASTERIZED DATA TO AN IMAGING DEVICE issued to Schoenzeit et al., U.S. Pat. No. 5,481,656 for ACCESSORY CONTROL DEVICE AND INFORMATION PROCESSING METHOD issued to Wakabayashi et al., U.S. Pat. No. 5,444,830 for METHOD AND APPARATUS FOR CONTROLLING EXPOSURE AND TRANSFERENCE IN AN ELECTROPHOTOGRAPHIC RECORDING APPARATUS issued to Oh et al. U.S. Pat. No. 4,992,956 for APPARATUS FOR ASSEMBLING DATA FOR SUPPLY TO A SCANNING OUTPUT DEVICE issued to Kaku et al., U.S. Pat. No. 4,991,108 for DATA PROCESSOR PRINTER ARRANGEMENT issued to Hamilton, U.S. Pat. No. 5,586,229 for BAND PRINTING METHOD FOR PREVENTING BAND OVERRUN ERROR IN PAGE PRINTER issued to Kim et al., U.S. Pat. No. 5,737,602 for IMAGE FORMING APPARATUS USING BAND BUFFERING SYSTEM AND PRINTING METHOD THEREOF issued to Lee, and U.S. Pat. No. 4,918,624 for VECTOR GENERATOR SCAN CONVERTER issued to Moore et al.

While these recent efforts provide advantages, I note that they fail to adequately provide an enhanced method for processing graphic data in a laser printer.

SUMMARY OF THE INVENTION

The present invention has been made to overcome the above described problem of the prior art. It is an object of the present invention to provide a method for processing graphic data in a laser printer in which a pre-processing and post-processing of graphic data can be carried out simultaneously by a graphic execution unit performing multi-tasks, thereby improving an effect of processing the graphic data.

To accomplish the above objects and others, there is provided a method for processing graphic data in a laser printer, which includes the steps of: processing data which are inputted from a host computer to generate low level primitive graphic elements, as a pre-processing of the graphic data; and generating and printing real bitmap image corresponding to a respective band on a recording paper during a feed of the recording paper after the data processing, as a post-processing of the graphic data.

According to the present invention, the pre-processing step includes the steps of: determining whether it is an end of page when the data are inputted from the host computer to the laser printer; transmitting the graphic elements to a post-processor if it is the end of the page; and processing the data inputted from the host computer to generate the graphic elements if it is not the end of the page.

Furthermore, the post-processing step includes the steps of: generating real bitmap image corresponding to a band if the band increases, in case that it is the start of a present page; determining whether it is the end of the present page by a graphic execution unit after generating the real bitmap image; and carrying out a new task if it is not the end of the page and ending the printing operation if it is the end of the page.

To achieve these and other objects in accordance with the principles of the present invention, as embodied and broadly described, the present invention provides a method, comprising: detecting end of page when graphic data are received at an image formation apparatus from a host computer; when end of page is detected, transmitting selected data to a post-processor unit; when end of page is not detected, processing said graphic data to generate graphic element data, said processing of said graphic data being performed by a pre-processor unit; processing said graphic element data to generate bitmap data corresponding to a respective band on a recordable medium during a transporting of the recordable medium along a path of conveyance in said image formation unit, said post-processor unit processing said graphic element data to generate bitmap data corresponding to a respective band on a recordable medium during a transporting of the recordable medium along a path of conveyance, said bitmap data being utilized to form an image on the recordable medium.

The present invention is more specifically described in the following paragraphs by reference to the drawings attached only by way of example. Other advantages and features will become apparent from the following description and from the claims.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

To achieve these and other objects in accordance with the principles of the present invention, as embodied and broadly described, the present invention provides a method, comprising: detecting end of page when graphic data are received at an image formation apparatus from a host computer; when end of page is detected, transmitting selected data to a post-processor unit; when end of page is not detected, processing said graphic data to generate graphic element data, said processing of said graphic data being performed by a pre-processor unit; generating said bitmap data corresponding to said respective band on the recordable medium, said generating of said bitmap data being performed by said post-processor unit; forming an image on the recordable medium corresponding to said bitmap data; when said bitmap data have been generated, detecting end of the present page, said detecting of end of the present page being performed by a graphic execution unit; and when end of the present page is detected, stopping said forming of said image on the recordable medium.

Figure 4A:
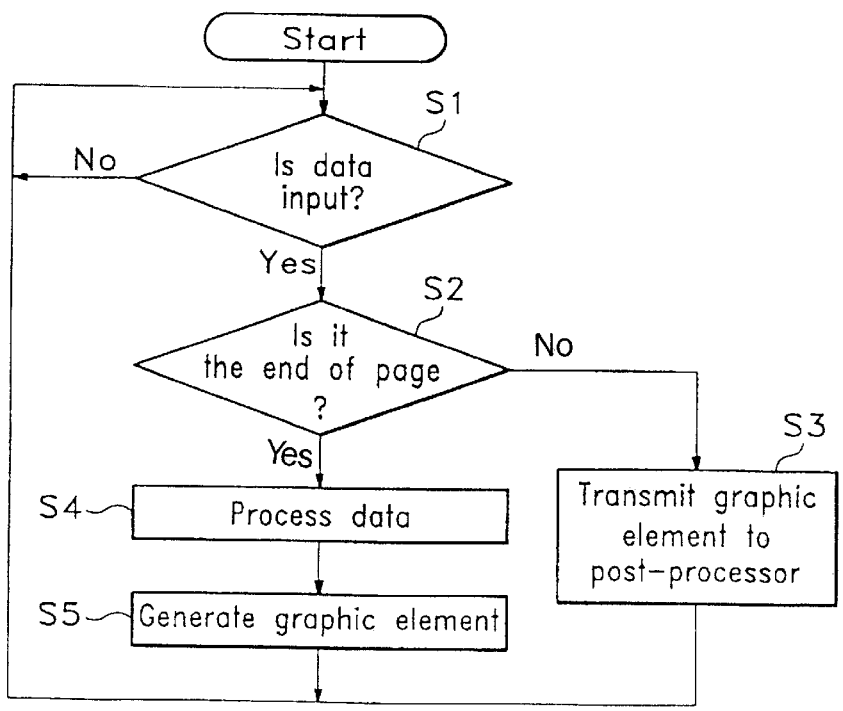
FIG. 4A is a flowchart showing a pre-processing of graphic data, in accordance with the apparatus; and forming an image on the recordable medium corresponding to said bitmap data.
Figure 4B:
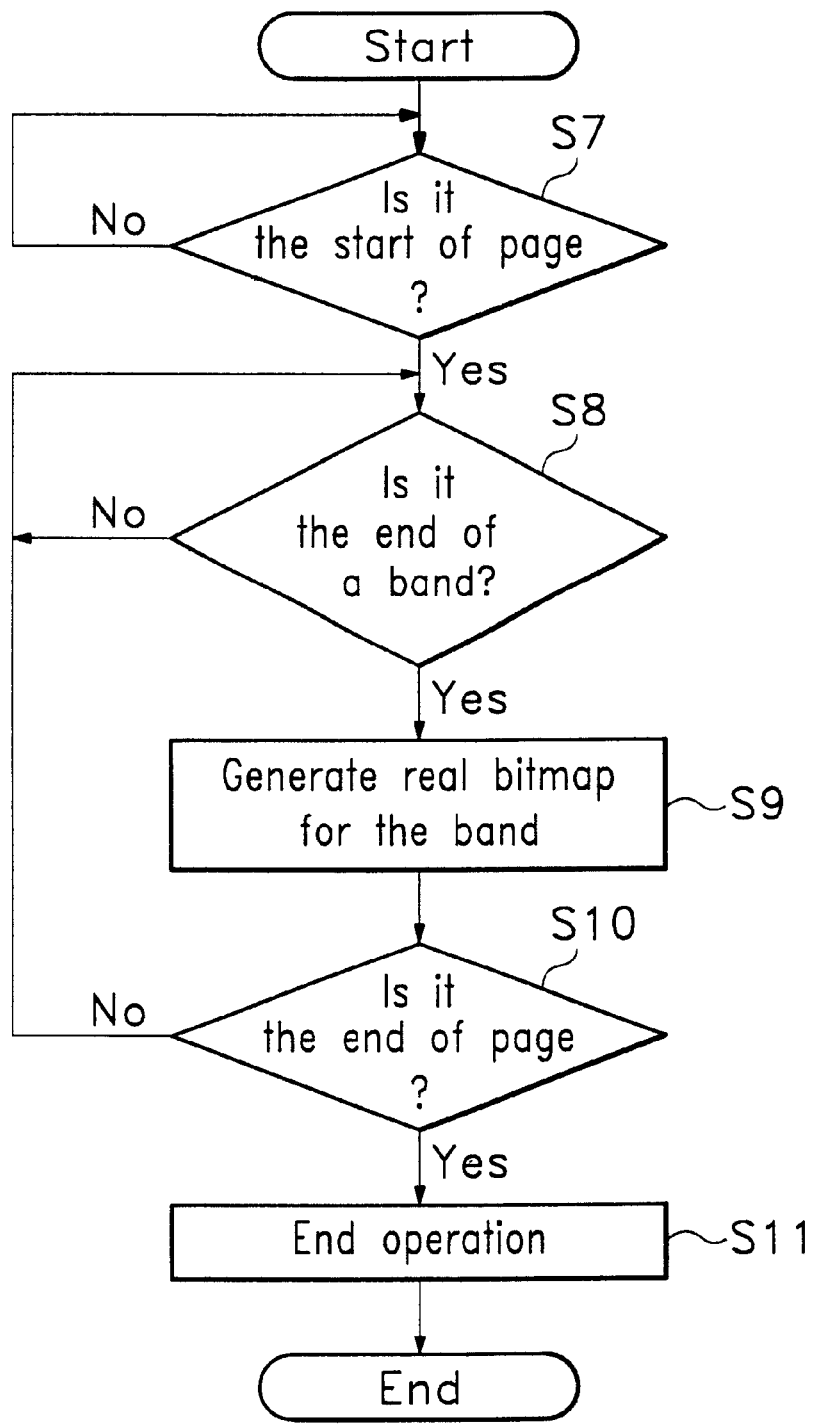

To achieve these and other objects in accordance with the principles of the present invention, as embodied and broadly described, the present invention provides an apparatus, comprising: a pre-processor unit receiving graphic data from a host computer, said pre-processor unit detecting end of page when said graphic data are received, said pre-processor unit transmitting selected data when said end of page is detected, said pre-processor unit processing said graphic data to generate graphic element data when said end of page is not detected; and a post-processor unit receiving said selected data from said pre-processor unit and receiving said graphic element data from said pre-processor principles of the present invention; and FIG. 4B is a flowchart showing a post-processing of graphic data, in accordance with the principles of the present invention.

DESCRIPTION OF THE PREFERRED EMBODIMENT

Figure 1:
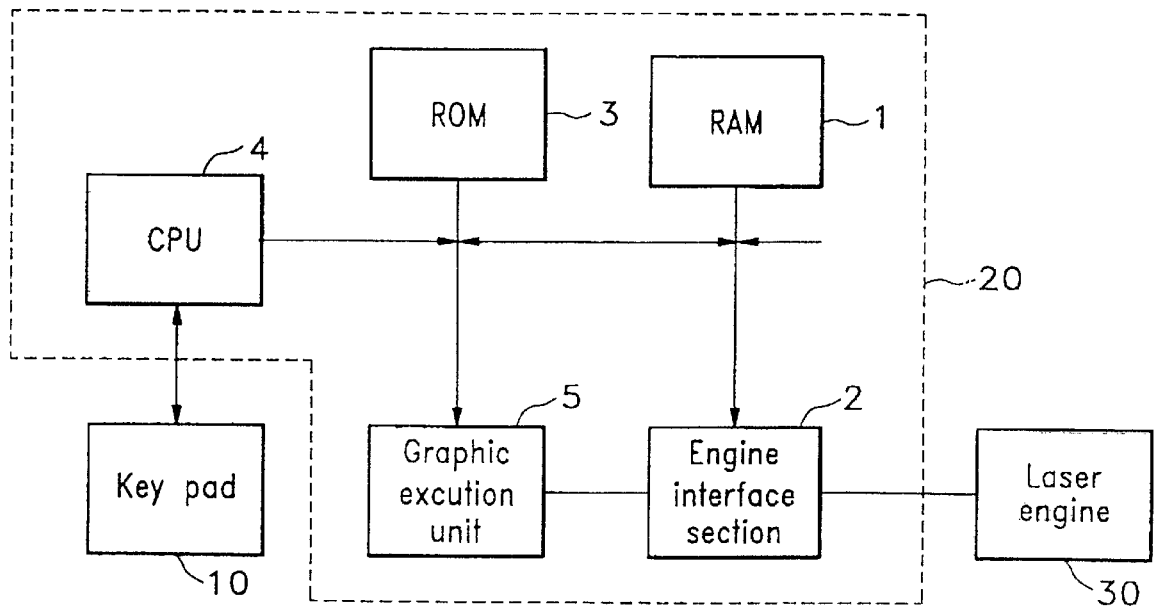
FIG. 1 is a block diagram showing a construction of a laser printer to which a graphic execution unit is applied.

Turn now to FIG. 1, which is a block diagram showing a construction of a laser printer to which a graphic execution unit is applied. FIG. 1 is a block diagram showing a construction of a laser printer which a graphic execution unit is applied to. As shown in FIG. 1, the laser printer includes a key pad 10, a controller section 20 for receiving documentary data from the host computer (not shown) and for transmitting the documentary data, and a laser engine 30 for printing the documentary data transmitted from the controller section 20.

The controller section 20 includes a random access memory (RAM) 1 for storing the documentary data, an engine interface 2 for transmitting the documentary data stored in random access memory 1 to the laser engine 30, a read only memory (ROM) 3 for storing information with reference to the control of each device, a central processing unit (CPU) 4 for controlling each device according to a control program stored in the read only memory 3, and a graphic execution unit 5 for processing images.

Figure 2:
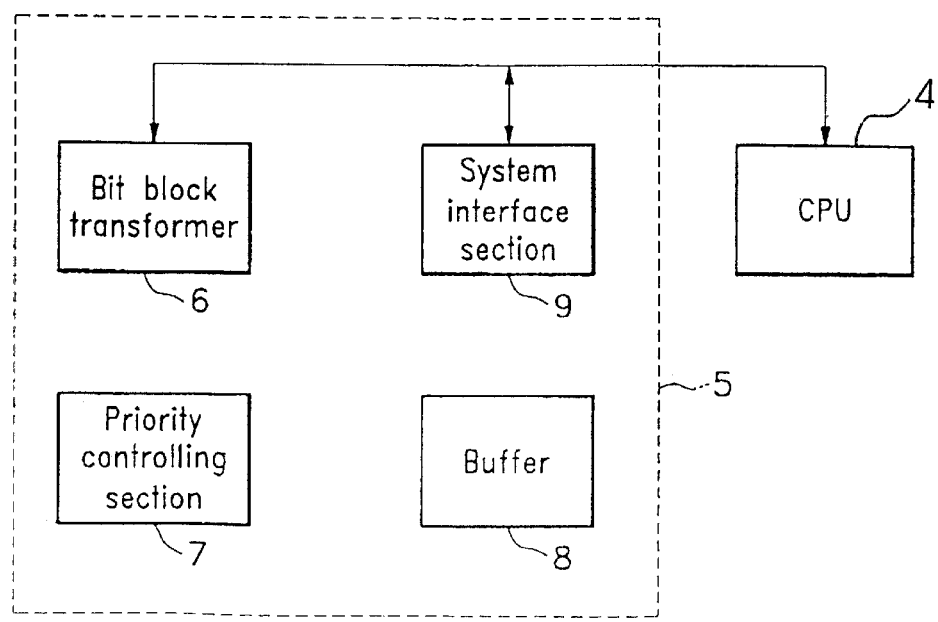
FIG. 2 is a block diagram schematically showing a construction of the graphic execution unit of FIG. 1.

Turn now to FIG. 2, which is a block diagram schematically showing a construction of the graphic execution unit of FIG. 1. The graphic execution unit 5 includes a bit block transformer 6 for processing images smoothly, a priority controlling section 7 for controlling execution order by providing a priority for elements to be operated parallel to each other so as to improve a processing performance of a system, and a buffer 8 for impermanently (temporarily) storing graphic data, and a system interface 9. The graphic execution unit 5 is coupled to the central processing unit 4.

With reference to the graphic execution unit 5 of the laser beam printer, however, it is intended to apply hardware only for the bit block transformer 6 to the graphic execution unit 5 so as to process the images smoothly, when constructing the image controller of the laser beam printer which is required for operation of processing image in a bit unit which is difficult.

As carrying out a single task, most of the hardware records values on a corresponding resister, and after starting the task, must wait for the end of the task.

In a case that the laser beam printer prints images on a plurality of papers, it is understood that the pre-processing and post-processing of image data are carried out simultaneously. Of course, the pre-processing and post-processing of image data are carried out by the hardware of the graphic execution unit 5. In the graphic execution unit 5 which performs only the single task, the pre-processing of the graphic data cannot be carried out before the post-processing of a page of the graphic data is completed. Accordingly, there is a disadvantage in that the performance of the system is degraded.

In other words, the disadvantage is that pre-processing for a second page cannot be performed until post-processing for a first page is completed. This is one feature that can cause a laser printer to be slow when printing a plurality of pages.

Hereinafter, a preferred embodiment of the present invention will be described in detail with reference to the accompanying drawings. Turn now to FIG. 3, which is a block diagram schematically showing a system, in accordance with the principles of the present invention. The system includes a host computer 40, a pre-processing section 50 for processing data inputted from the host computer 40 to generate graphic elements having a low level, an engine band processing section 60 for processing the graphic elements which are corresponding to each band and processed at the pre-processing section 50 on a paper, and a post-processing section 70 for generating and printing real bitmap image which is processed at the engine band processing section 60.

Turn now to FIG. 4A, which is a flowchart showing a pre-processing of graphic data, in accordance with the principles of the present invention. At step S1, it is determined whether data are inputted from the host computer 40 to the pre-processing section 50. At step S2, it is determined whether it is an end of a page if the data are inputted from the host computer 40 to the pre-processing section 50. At step S3, the pre-processing section 50 transmits the graphic elements to the post-processing section 70 if it is the end of the page. At step S4, if it is not the end of the page, the pre-processing section 50 processes the graphic data inputted from the host computer 40. At a step S5, a graphic execution unit 5 generates the graphic elements from the processed data.

Turn now to FIG. 4B, which is a flowchart showing a post-processing of graphic data, in accordance with the principles of the present invention. FIG. 4B is a flowchart showing the post-processing of the graphic data during the feeding of papers to the printer engine. At step S7, it is determined whether it is a start of a page after the pre-processing. At step S8, it is determined whether the end of a band has been reached, if it is the start of the page. At step S9, if the band increases, the post-processing section 70 generates a real bitmap corresponding to the band. At step S10, it is determined by the graphic execution unit 5 whether it is an end of the page after generating the real bitmap in the step S9. At step S11, the post-processing section 70 performs a new task if it is not the end of the page and finishes the present task if it is the end of the page.

Figure 3:
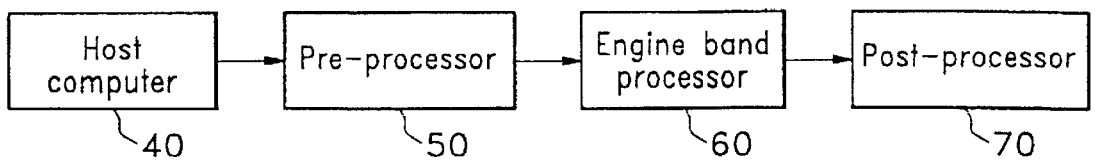
FIG. 3 is a block diagram schematically showing a system, in accordance with the principles of the present invention.

Hereinafter, the pre-processing and post-processing of the graphic data will be described in detail with reference to FIGS. 3 to 4B, in accordance with the principles of the present invention. At step S1, it is determined whether data are inputted from the host computer 40. At step S2, it is determined whether it is an end of a page if the data are inputted from the host computer 40 to the pre-processing section 50. At step S4, if it is not the end of the page, the pre-processing section 50 processes the graphic data inputted from the host computer 40. At step S5, a graphic execution unit 5 generates the graphic elements from the processed data.

At step S3, the pre-processing section 50 transmits the graphic elements to the post-processing section 70 if it is the end of the page in the step S2.

On the other hand, at step S7, it is determined whether it is a start of a page after the pre-processing. At step S8, it is determined whether it is the end of a band, if it is the start of the page. At step S9, if the band increases, the post-processing section 70 generates a real bitmap corresponding to the band. At step S10, it is determined by the graphic execution unit 5 whether it is an end of the page after generating the real bitmap in the step S9. At step S11, the post-processing section 70 performs a new task if it is not the end of the page and finishes the present task if it is the end of the page.

As described above, the processing of the graphic data can be carried out by the graphic execution unit in the pre-processing section 50 at anytime if desired, whereas, if the post-processing section 70 carries out the processing of the graphic data by using the graphic execution unit during the processing of the graphic data in the pre-processing section 50, the graphic execution unit impermanently (temporarily) finishes the processing of the graphic data and stores the present graphic data in a random access memory (RAM) so as to perform a new task in the post-processing section 70.

According to the present invention, the pre-processing of the graphic data can be carried out in the laser beam printer regardless of the post-processing of the graphic data which has been carried out, thereby improving the effect of processing the graphic data.

The foregoing paragraphs describe the details of a method for processing graphic data, and more particularly to a method for processing graphic data in a laser printer capable of improving an effect of processing the graphic data, in which the graphic data are processed even though post-processing of the graphic data is not completed while pre-processing of the graphic data is performed.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method, comprising:

detecting end of page when graphic data are received at an image formation apparatus from a host computer;

when end of page is detected, transmitting selected data to a post-processor unit;

when end of page is not detected, processing said graphic data to generate graphic element data, said processing of said graphic data being performed by a pre-processor unit;

processing said graphic element data to generate bitmap data corresponding to a respective band on a recordable medium during a transporting of the recordable medium along a path of conveyance in said image formation apparatus; and forming an image on the recordable medium corresponding to said bitmap data;

said processing of said graphic element data to generate said bitmap data further comprising:

generating said bitmap data corresponding to said respective band on the recordable medium when said respective band increases at start of a present page;

when said bitmap data have been generated, detecting end of the present page, said detecting of end of the present page being performed by a graphic execution unit; and when end of the present page is detected, stopping said forming of said image on the recordable medium.

2. The method of claim 1, wherein said processing of said graphic element data corresponds to a post-processing of said graphic data performed by said post-processor unit.

3. The method of claim 1, wherein said processing of said graphic data corresponds to a pre-processing of said graphic data.

4. The method of claim 1, wherein said processing of said graphic element data corresponds to a post-processing of said graphic data.

5. The method of claim 1, wherein said graphic element data correspond to low level primitive graphic elements.

6. The method of claim 1, wherein said image formation apparatus corresponds to an electrophotographic printer.

7. The method of claim 6, wherein said processing of said graphic data corresponds to a pre-processing of said graphic data performed by said pre-processor unit.

8. The method of claim 6, wherein said processing of said graphic element data corresponds to a post-processing of said graphic data performed by said post-processor unit.

9. The method of claim 1, wherein said selected data corresponds to said graphic data.

10. The method of claim 1, wherein said selected data corresponds to selected graphic element data generated from said graphic data.

11. A method, comprising:

detecting end of page when graphic data are received at an image formation apparatus from a host computer;

when end of page is detected, transmitting selected data to a post-processor unit;

when end of page is not detected, processing said graphic data to generate graphic element data, said processing of said graphic data being performed by a pre-processor unit;

generating bitmap data corresponding to a respective band on the recordable medium, said generating of said bitmap data being performed by said post-processor unit;

forming an image on the recordable medium corresponding to said bitmap data;

when said bitmap data have been generated, detecting end of the present page, said detecting of end of the present page being performed by a graphic execution unit; and when end of the present page is detected, stopping said forming of said image on the recordable medium.

12. The method of claim 11, wherein said image formation apparatus corresponds to a laser printer.

13. The method of claim 11, wherein said selected data corresponds to said graphic data.

14. The method of claim 11, wherein said selected data corresponds to selected graphic element data generated from said graphic data.

15. The method of claim 11, wherein said generating of said bitmap data corresponding to said respective band on the recordable medium is performed when said respective band increases at start of the present page.

16. The method of claim 15, wherein said processing of said graphic element data corresponds to a post-processing of said graphic data performed by said post-processor unit.

17. An apparatus, comprising:

a pre-processor unit receiving graphic data from a host computer, said pre-processor unit detecting end of page when said graphic data are received, said pre-processor unit transmitting selected data when said end of page is detected, said pre-processor unit processing said graphic data to generate graphic element data when said end of page is not detected; and a post-processor unit receiving said selected data from said pre-processor unit and receiving said graphic element data from said pre-processor unit, said post-processor unit processing said graphic element data to generate bitmap data corresponding to a respective band on a recordable medium during a transporting of the recordable medium along a path of conveyance, said bitmap data being utilized to form an image on the recordable medium;

said pre-processor unit performing said processing of said graphic element data by generating said bitmap data corresponding to said respective band on the recordable medium when said respective band increases at start of a present page, detecting end of the present page when said bitmap data have been generated, and stopping forming of said image on the recordable medium when end of the present page is detected.

18. The apparatus of claim 17, wherein said apparatus corresponds to an electrophotographic printer.

19. The apparatus of claim 17, said graphic element data corresponding to low level primitive graphic elements.

20. The apparatus of claim 17, said selected data corresponding to said graphic data.

* * * * *